Jan. 11, 1966    J. I. MUSIANOWYCZ    3,228,647
LOCKING DEVICE FOR SEATS AND THE LIKE
Filed Dec. 11, 1963
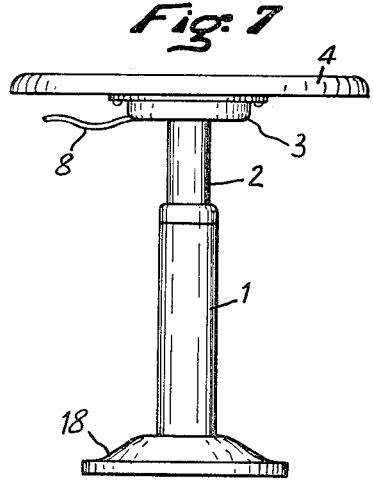
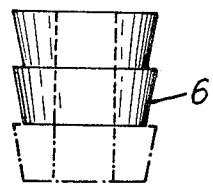
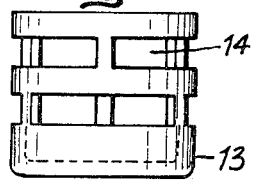
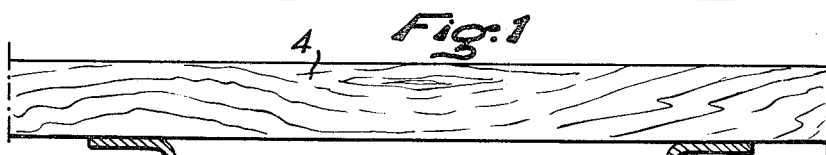
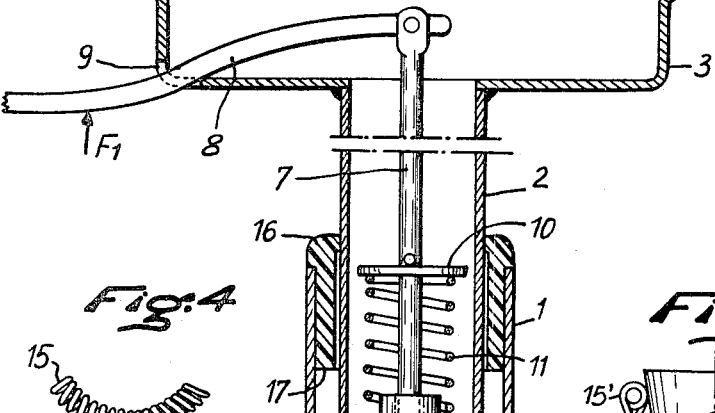
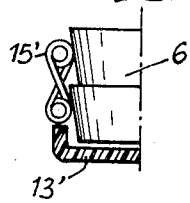
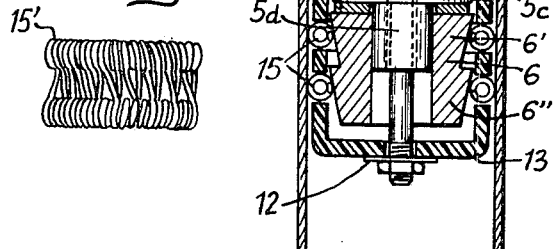

United States Patent Office 3,228,647
Patented Jan. 11, 1966

3,228,647
LOCKING DEVICE FOR SEATS AND THE LIKE
Jaroslaw Ivan Musianowycz, Paris, France, assignor to Nouvelle Societe Mirima, Lyons, France
Filed Dec. 11, 1963, Ser. No. 329,654
Claims priority, application France, Sept. 19, 1963, 948,020, Patent 1,378,935
5 Claims. (Cl. 248—412)

A large number of teleslopic supports carrying seats and the like at an adjustable height are already known at the present time, which supports are constituted by two tubular elements of which one slides inside the other, so that the support may be held fast with the seat at the desired height by a wedging, between the lower frustoconical end of the lower element and the inner wall of the upper tubular element, of rigid members guided by a part controlled from the outside. The use of rigid elements, for instance of balls or rollers, for locking the system in position provides results which are better than those obtained with elastic means, such as springs, or rubber jaws or sleeves, the locking being more reliable; however the use of such means leads with time to serious drawbacks consisting in their deformation and wear. Such rigid elements, whether balls or rollers are wedged after the vertical adjustment of the support and during the use of the seat or the like arrangement incorporating the support between the frusto-conical end of the inner tube and the inner wall of the outer tube.

In all known devices of such a type, said rigid locking elements form a limited number of bearing points which are clearly defined, said points being distributed in a common radial plane in which the pressure exerted by the elements is concentrated.

The pressure exerted on the support is thus distributed by such elements between the lower frusto-cone and the outer tube. As concerns the frusto-cone, the above-mentioned rigid elements are always urged into engagement with a predetermined area of the latter and this leads unavoidably to its deformation even when a highly resistant material is used for the execution of the frustocone.

Similarly, the outer tube, when adjusted constantly to provide the same height for the support, shows after some time of use deformations formed by the balls or rollers urged against its inner wall.

Even the use of outer tubes having very thick walls does not remove this drawback since the inner surface of such tubes are nevertheless deformed.

The wear of the frustocone and of the inner wall of the outer tube prevents the locking means from being operative.

My invention has for its object to remove said drawback and to distribute the pressure more uniformly over a larger total area. This result is achieved by distributing the rigid locking elements in several areas.

Further advantages and features of the invention and, in particular, a simplified arrangement of the pivotal means and the use of a completely independent stepped frustocone which need not be rigid with the inner tube will appear in the reading of the following description given by way of example of an embodiment of my invention reference being made to the accompanying drawings wherein:

FIG. 1 is partly an axial cross-sectional view of my improved support in its locked position, FIG. 2 is a detail view showing the independent member provided with a plurality of frusto-conical surfaces and adapted to carry the lower tubular element.

FIG. 3 is an elevational view of the cake forming part of the guiding member inside which are housed the locking members.

FIG. 4 is a plan view of locking means in the shape of a section of a torus,

FIG. 5 is an elevational view of a dual annular structure enclosing the peripheries of both frustocones, FIG. 6 is a transverse cross-section of a double annular packing structure urged against the stepped frustoconical member and associated with a simple guiding cup.

FIG. 7 is an outer view of a seat provided with a support according to my invention.

As illustrated in the drawings, it is apparent that the telescopic support according to my invention includes, in a conventional manner, an outer tubular element 1 inside which may slide an inner tubular element 2 to the upper end of which is secured, in the example illustrated, a seat 4 which is connected with the inner tubular element 2 through an intermediate flanged member 3. Over the opposite lower end of the inner tubular element 2 is fitted a stepped axially bored plug 5. The cylinder formed by the main broad section 5a of the plug 5b is crimped over the inturned lower edge of the tube 2, whereas the lowermost extension 5d of the plug 5 which has a reduced cross-section extends downwardly into the axial bore of the double frustocone 6, so as to ensure the centering of the whole arrangement, the parts 5, 6 being independent of each other.

The double frustocone which is made of a very hard material is given the shape of two superposed upwardly flaring frustocones. The plug 5 and the frusto-cone 6 are provided with an axial bore engaged by a rod 7 the upper end of which is pivotally secured to a control handle 8 forming a two-arm lever, which latter pivotally engages the edge of the flanged member 3 through an opening 9 of which the handle 8 passes. To a point of the rod 7 is secured a stop 10 constituted by a washer against the lower surface of which the upper end of a spring 11 bears, while the lower end of said spring engages the upper surface of the main section 5b of the plug 5, and the uppermost section 5a of a smaller diameter of said plug 5 serves for guiding the rod 7 and the spring 11.

Over the lower end of said rod 7 extending underneath the double frustocone 6 is secured a nut 12 which ensures the connection between the rod 7 and a guiding member 13 resting on the nut. The latter is in the general shape of a cup provided in its upstanding peripheral wall with openings 14 arranged in tiers, the number of which corresponds to the number of frustocones forming the multiple frustocone 6.

Inside said openings 14 are housed the locking members 15 constituted preferably by steel wires wound into a coil formation bent into the shape of an arcuate member; said locking members are perfectly rigid transversely, while they are slightly deformable in an axial direction.

When the arrangement is locked, the locking members 15 are wedged between the inner wall of the tubular element 1 and the lateral surfaces of the elementary frustocones 6' and 6" forming the multiple frustocone 6.

When it is desired to release the support, the outer section of the handle 8 outside the flange 3 is urged upwardly, so that the rod 7 may execute a downwardly directed movement releasing the pressure on the guiding member or cup 13. At the same time and with a view to releasing the frustocone 6, the seat 4 is raised, so that the locking members 15 are shifted with reference to the frusto-cones 6', 6" which are thus released.

The rod 7 can raise, the cage or cup 13 when the frustocone is wedged, but it remains free with reference to said cage 13, when it sinks, that is when the frusto-cone is to be released. Thus, the release cannot be executed when the telescopic system carries a load, the cup remaining unmoved.

As illustrated in FIGS. 5 and 6, the locking members 15 may be constituted by a compound wire winding extending round several elementary frusto-cones.

Obviously the cages or cups 13 are provided, in such a case with suitably shaped ports adapted to house such locking members or else, the cups 13 are replaced by ordinary non-perforated cups 13' (FIG. 6).

The locking members 15 including several tiers may be replaced by a multiple ring 15' as illustrated in FIG. 6. In such a case, the cup guiding them is a simple non-perforated cup such as that illustrated at 13' in FIG. 6.

The essential for operation consists in that the multiple frustocone 6 is subjected to a pressure at its points of contact with the locking members, which pressure transmitted by the latter to their points of contact with the tube 1 is no longer concentrated in an annular narrow area, but is distributed uniformly over a broader area, whereby speedy wear is prevented and the structure disclosed differs from the known locking devices of the same type wherein the concentration of the pressure cannot be resisted by the best materials after a protracted time of use.

The tube 2 is guided during its sliding movements by the sleeve 16 fitted in the upper end of the tube 1. The lower edge 17 of said sleeve 16 serves as an abutment against which the cup 13 or else the upper edge of the multiple frustocone 6, in the case where the ported cup 13 is replaced by a non-perforated cup 13', impinges at the end of an exaggerated rising movement of the seat, so as to prevent thus the dismantling of the whole arrangement.

The pivotal movement of the seat secured to the tube 2 with reference to the tube 1 is an easy matter as provided by the insertion of a washer 19 between the main section 5c of the plug 5 and the upper surface of the upper elementary frustocone 6' of the multiple frustocone 6, said washer surrounding coaxially the lower smaller diameter extension 5d of the plug 5. Said washer is made of brass, the material sold under the registered tradename "Nylon" or a suitable self-lubricating material.

This pivotal arrangement is of a great simplicity when compared with the conventional systems such as ball bearings or frustoconical washers made of brass. Ball bearings are in fact expensive and lead to a lateral lack of stability whenever the seat is moved even to a slight extent, while a frustoconical washer, in contradistinction, wears speedily and locks the parts against pivotal movement.

The pivotal movement of the seat becomes still easier in accordance with my invention, since the multiple frustocone 6 is independent of the plug 5 forming the lower end of the inner tube 2. It is guided axially in a reliable manner by the lowermost extension 5d of the plug and is by no means braked by said extension during its vertical movements and it is also independent radially of said extension 5d. Thus, although the multiple frusto-cone 6 is wedged and held fast after locking, it allows a free pivotal movement of the plug 5 and of the tube 2 rigid therewith.

It may occur that my improved support is to be used in a manner such that the pivotal movement of the inner tube with reference to the outer tube is not necessary and is even objectionable. In such a case, it is possible to rigidly secure the multiple frustocone to the lower end of the inner tube by providing for instance a further suitably shaped step crimped over said tube.

From the preceding description, it is apparent that my improved support ensures a reliable and speedy release and locking while it reduces to a minimum the wear of the different parts of said support and allows an accurate guiding and an easy pivotal movement of the seat together with a substantial simplification of the whole arrangement.

Obviously, many modifications may be brought to the structural details and to the shape of the parts of the support within the scope of the accompanying claims.

What I claim is:

1. Locking means for a seat and the like comprising an outer supporting tube, an inner tube located slidingly within said outer tube to carry the seat, a control rod extending coaxially through said inner tube, an axially bored member slidable on said rod, a plurality of superposed coaxial rigidly interconnected upwardly flaring frusto-cones located on the periphery of said member, said member being located on said control rod underneath the lower end of said inner tube and inside said outer tube, a plurality of annular arcuate coil springs distributed uniformly around the periphery of said frusto-cones between said member and the inner surface of said outer tube, a cup-shaped guiding member slidingly and axially carried by said control rod underneath said member having an upstanding peripheral flange provided with ports to receive and hold in position said coil springs, a stop fixed to said control rod below the lower surface of said guiding member, spaced abutments formed on said inner tube and said control rod, a spring located between said abutments urging said control rod to stop upwardly relative to said inner tube, and manual means to move said control rod downwardly against the action of said spring to move said stop away from said guiding member to release the upward pressure exerted on said member by said spring.

2. Locking means as set forth in claim 1 wherein said annular coil springs comprise a plurality of radially rigid axially yielding members distributed uniformly along the periphery of said superposed frusto-cones to form a discontinuous plurality of small frictional areas between said frusto-cones and said outer tube, said radially rigid members forming a single annular wire winding surrounding all said frusto-cones.

3. Locking means as set forth in claim 1 wherein said spaced abutments comprise a second stop on said control rod above said member and an axially bored cylinder coaxially fixed to the lower end of said inner tube and including a body and a lower coaxial axially bored extension of a smaller diameter extending into said member.

4. Locking means as set forth in claim 3 wherein said member is revolvably and slidingly fitted in the bore of the lower extension of said cylinder, underneath the lower surface of the cylinder, and inside said outer tube.

5. Locking means as set forth in claim 4 wherein a washer is fitted round the lower extension of said cylinder between the lower surface of said cylinder and the upper surface of said member.

References Cited by the Examiner

UNITED STATES PATENTS

| | | | |
|---|---|---|---|
| 720,549 | 2/1903 | Adler | 248—412 |
| 1,075,323 | 10/1913 | Benjamins | 248—412 |
| 2,529,861 | 9/1945 | Angell et al. | 248—412 |
| 2,711,209 | 6/1955 | Riabouol | 248—412 |
| 2,991,096 | 7/1961 | Davidson | 287—58 |

FOREIGN PATENTS

| | | |
|---|---|---|
| 528,038 | 4/1954 | Belgium. |
| 1,093,531 | 11/1954 | France. |

CLAUDE A. LE ROY, *Primary Examiner.*